Feb. 18, 1930.  C. H. ALLEN  1,747,280
HANDLE FOR RECEPTACLES
Filed Aug. 15, 1927  3 Sheets-Sheet 1
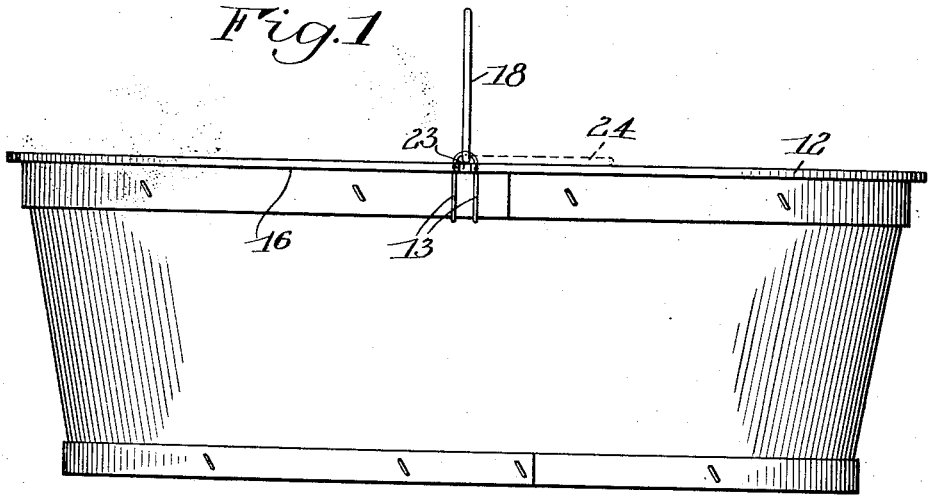
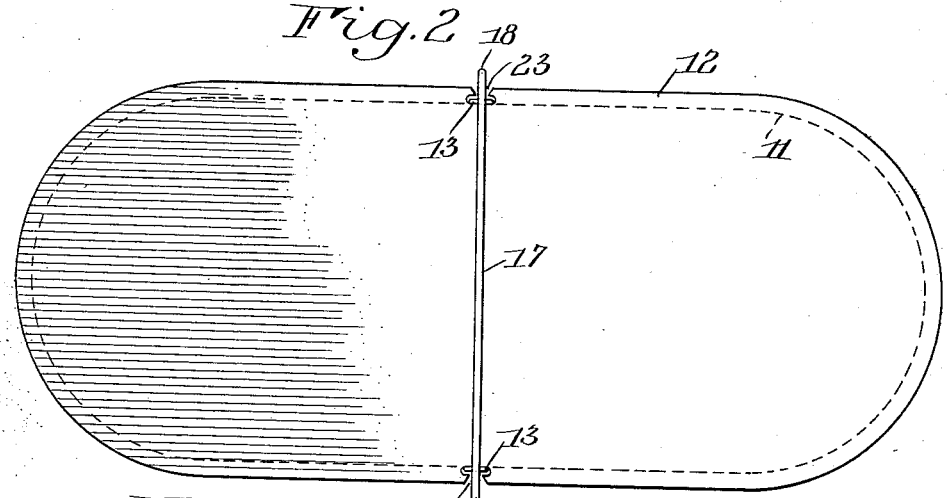
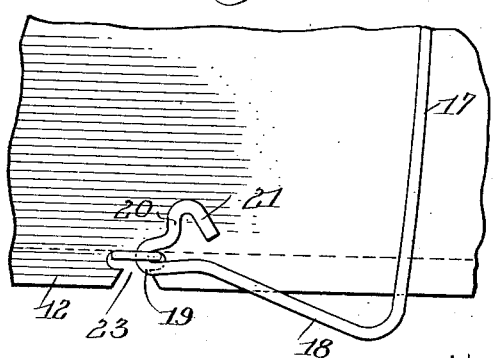
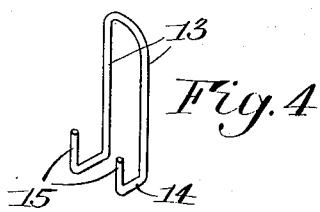
INVENTOR
Charles H. Allen
BY Harold E. Stonebraker
his ATTORNEY Feb. 18, 1930.　　　　C. H. ALLEN　　　　1,747,280
HANDLE FOR RECEPTACLES
Filed Aug. 15, 1927　　　3 Sheets-Sheet 2
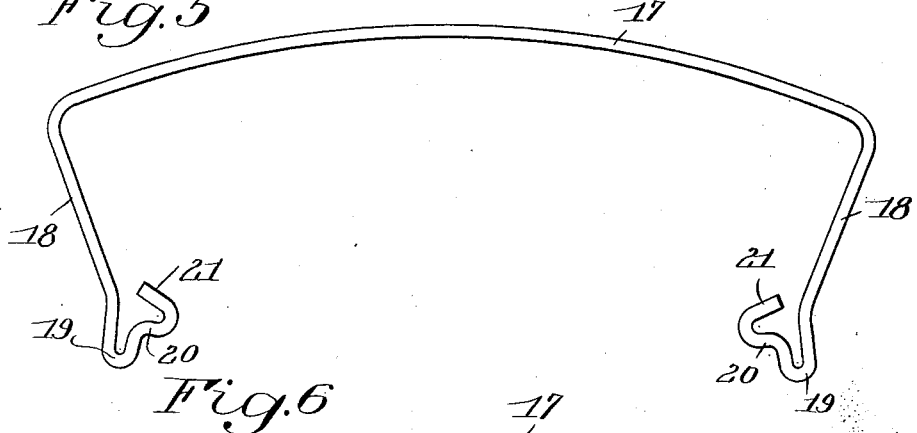
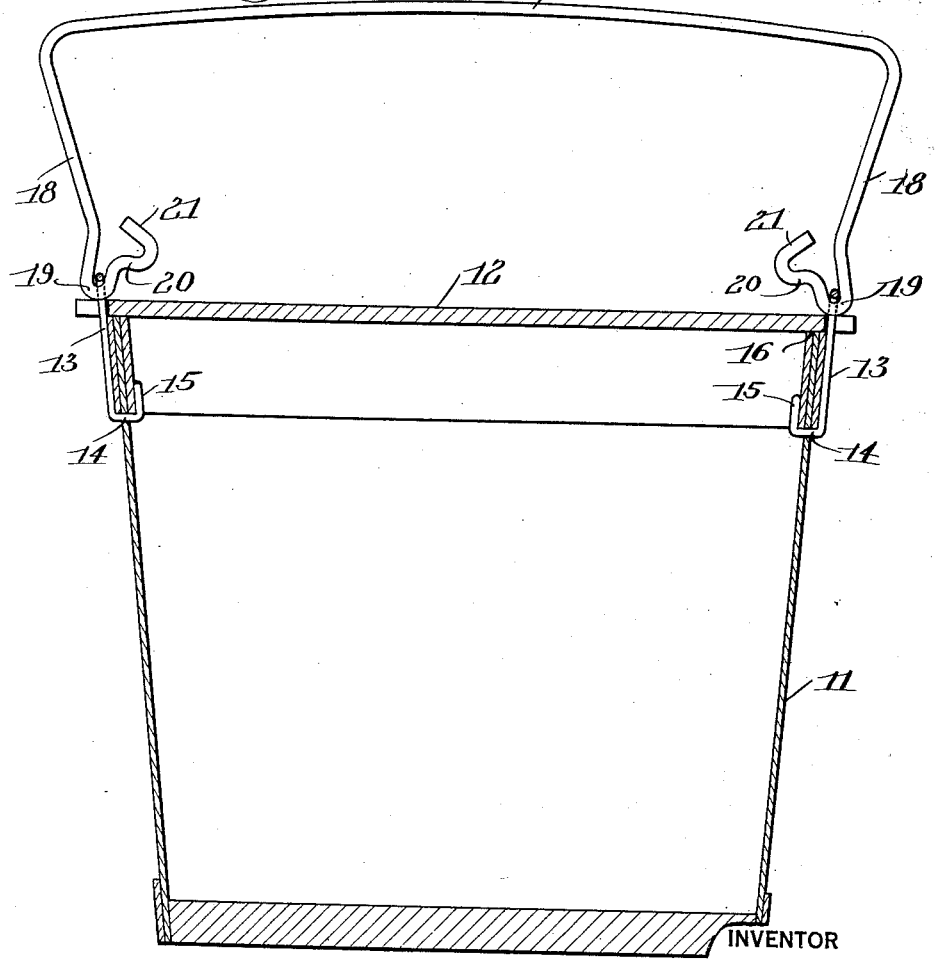
INVENTOR
Charles H. Allen
BY Harold E. Stonebraker
his ATTORNEY Feb. 18, 1930.                C. H. ALLEN                1,747,280
                          HANDLE FOR RECEPTACLES
                          Filed Aug. 15, 1927        3 Sheets-Sheet 3

INVENTOR
Charles H. Allen
BY
Harold E. Stonewalker
his ATTORNEY

Patented Feb. 18, 1930

1,747,280

UNITED STATES PATENT OFFICE

CHARLES H. ALLEN, OF PENN YAN, NEW YORK, ASSIGNOR TO YATES LUMBER COMPANY, OF PENN YAN, NEW YORK, A CORPORATION OF NEW YORK

HANDLE FOR RECEPTACLES

Application filed August 15, 1927. Serial No. 213,015.

This invention relates to handles for use in connection with receptacles, particularly of the kind known as grape baskets, though it is not limited in its application to such receptacles, and the inventive idea could be applied equally well to other types of containers.

One object of the invention is to provide a pivoted handle which may be removed from the receptacle at will, but which cannot become separated therefrom accidentally.

Another object of the invention is to provide, in a receptacle having a removable cover, a handle which is effective to hold the cover in place.

A further object of the invention is to form the handle in such a way that it will not interfere appreciably with placing a cover on the receptacle and which at the same time will hold the cover from accidental displacement after it has been applied to the receptacle.

Still another object of the invention is to provide a handle which will have a tendency to draw the sides of the receptacle together, thus helping to prevent them from bulging.

An additional object of the invention is to provide a handle which may be removed readily so that empty receptacles may be telescoped within each other; and one which, when attached to the receptacle, will not interfere with the receptacles being piled one upon another.

With these and other ends in view, the invention comprises the structure and combination of parts which will appear more clearly from the following description when read in conjunction with the accompanying drawings, the novel feature being pointed out in the claims following the description.

In the drawings:

Figure 1 is a side elevation of one form of receptacle showing one possible embodiment of my invention applied thereto;

Figure 2 is a plan thereof;

Figure 3 is an enlarged plan of part of a receptacle showing details;

Figure 4 is a perspective view of one possible embodiment of a member to connect the handle with the receptacle;

Figure 5 is a view of one possible form of handle showing it removed from the receptacle;

Figure 6 is a vertical section through a receptacle with a cover thereon showing the handle applied to the receptacle;

Figure 7:
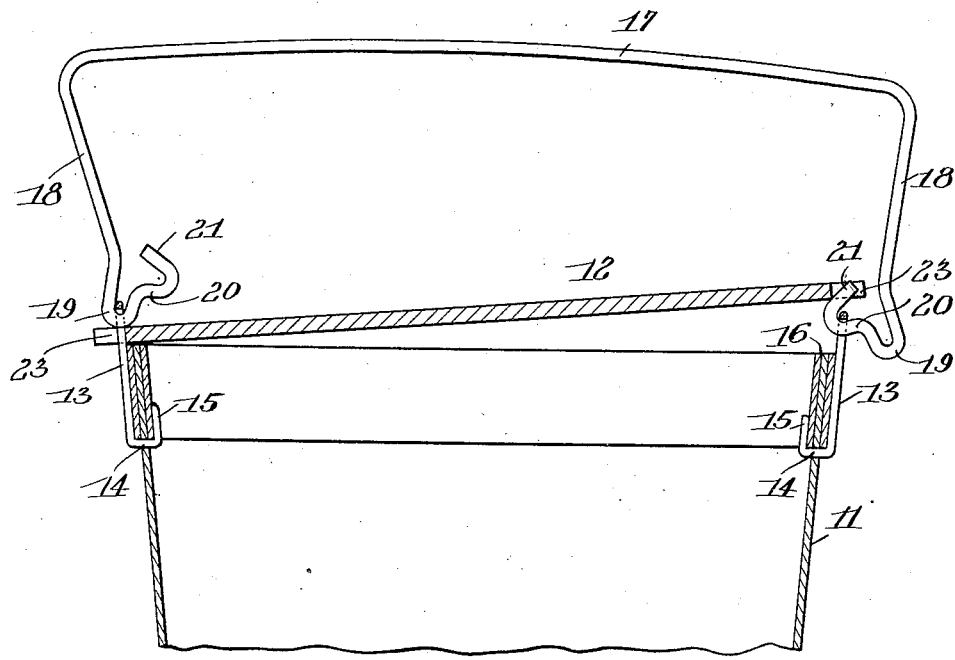
Figure 7 is a view illustrating the placing of a cover upon the receptacle.

In receptacles of the kind ordinarily known as grape baskets, and others of a similar nature, it has heretofore been customary to provide a handle consisting of a stiff piece of wire rigidly attached to the sides of the receptacle. This wire, extending as it does across the top of the basket, prevents empty baskets from being telescoped or stacked one within the other. When the baskets are filled and covers placed thereon, the handle likewise prevents the baskets from being piled one on top of another, unless the handle be bent over so as to lie flat on the cover.

The present invention contemplates the provision of a handle which may be removed readily when desired, so that empty receptacles may be telescoped within each other for economy of space during storage or transportation, and which, when applied to a receptacle, may be moved to such a position that it will not interfere with the receptacles being piled one on top of another. Furthermore, this novel handle is of such a construction that it holds the cover of the receptacle in place, preventing accidental removal thereof. Preferably guiding means is provided on the handle so that the cover may be slipped readily into place without the exercise of great care or effort.

The drawings show one possible embodiment of the invention as applied to a receptacle designated generally by the numeral 11, the detailed construction of this receptacle being no part of the present invention. As is customary in receptacles of this kind, a removable cover or lid 12 may be provided. Fixed to the sides of the receptacle are members for connecting the handle to the receptacle. These connecting members may be made in a variety of ways, one possible form thereof comprising a wire bent into a general U-shape, as shown in Figure 4, so as to form a loop portion 13. The free ends of the loop portion extend through the walls of the receptacle at 14 and are then bent back upon themselves at 15 so as to be held firmly in the receptacle. These connecting members are made of such size and positioned in the receptacle in such a manner that the top of the loop 13 will extend slightly above the top edge 16 of the receptacle, as is clearly shown in Figures 1, 6, 7 and 8. Preferably the connecting member is formed of resilient material so that it normally lies against the side of the receptacle, as shown at the left hand side of Figure 8, but so that it can be sprung outward from the side when desired, as shown at the right hand side of said figure, and will return to its normal position when released.

The handle itself might be made in many forms. One possible embodiment consists of a piece of wire bent into the shape shown in Figure 5. The transverse portion 17 of the handle is somewhat bowed, as shown in this figure, and the ends of the wire are bent at approximately right angles to the transverse portion to form the sides 18 which, at their lower ends, carry hook-like supporting portions 19 making a slight angle with the side portion of the handle. The ends of the wire after being formed into the hook-like supporting portion 19 are bent at approximately right angles to form inwardly extending offset retaining portions 20, for the purpose described below, and then further bent upwardly and outwardly to form oblique cam portions 21, for the purpose of guiding the cover of the receptacle, as will be more particularly described hereinafter.

It will be noted that the distance from the hook-like portion 19 on one side of the handle to the corresponding point on the other side is slightly less than the width of the basket. Consequently, when the handle is applied to the basket, it must be slightly expanded in order to be connected to the members 13. This expansion or pulling apart of the hook-like portions 19 relative to each other is possible because of the resilient nature of the wire from which the handle is constructed, and it results simply in somewhat straightening the bowed transverse portion 17 of the handle. It will be noted from Figures 5 and 6 that the transverse portion 17, when the handle is free and unrestrained, is somewhat more curved than when the handle has been applied to a receptacle. The resilience of the handle will of course tend to bring the hook-like portions 19 toward each other after they have been pulled apart for attachment to the receptacle, and therefore the handle will have a tendency to draw the sides of the receptacle together, thus giving additional support to the sides. This is particularly important in a receptacle of the grape basket type, because these baskets are long and narrow, and while the ends of the basket have considerable rigidity, the sides are often comparatively weak and apt to bulge outward when the basket is filled.

When the receptacles are empty, and the covers have not been placed thereon, they may be transported or stored much more economically by stacking them inside each other or telescoping them, this being possible because the sides of the receptacles are slightly tapered. However, with the rigid handles heretofore in use this could not be accomplished, because even though the handles were bent over as above described to permit piling the receptacles on each other, they would still interfere with one receptacle being inserted inside another. In order to allow telescoping of receptacles of this type, it is essential that the handle be removable, and such removal may be accomplished easily in a handle constructed according to the present invention.

Figure 8:
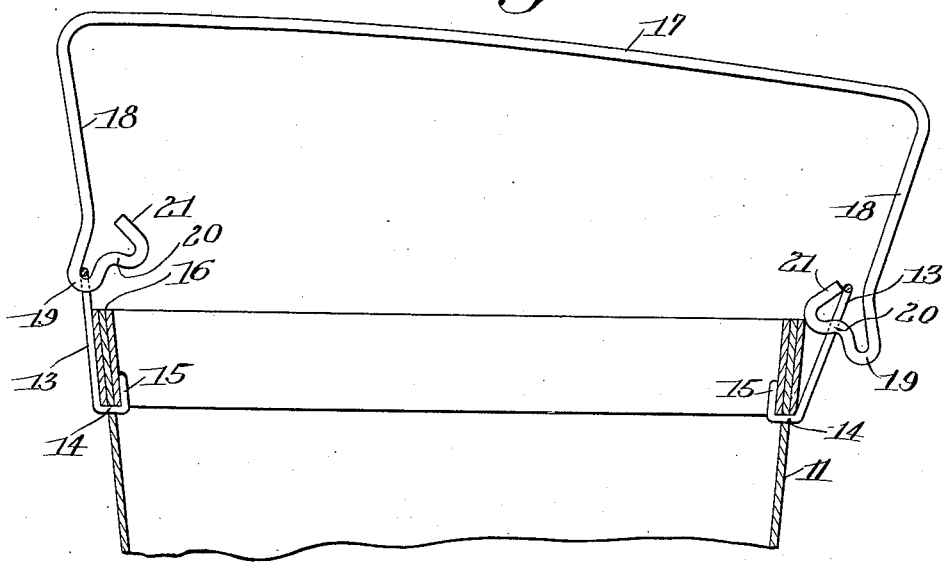
Figure 8 is a section through part of a receptacle showing the handle being applied thereto or removed therefrom.

It will be noted from Figure 8 that the offset portion 20 of the handle overlies the top edge 16 of the receptacle and therefore would normally prevent the handle from dropping downward so far as to become disengaged from the loops 13 of the connecting members. It is possible to remove the handle easily when desired, however, simply by springing the connecting members outwardly, as shown at the right hand side of Figure 8, so as to allow the portions 20 and 21 of the handle to pass between the loop 13 and the side of the receptacle. This action is clearly illustrated in Figure 8, and further description thereof is believed to be unnecessary. When the handle has been removed and the member 13 is released, it will spring back against the side of the receptacle on account of the resilience of the member. To apply a handle to the receptacle, the process is reversed, the connecting member or loop 13 being pulled outwardly and the portions 20 and 21 of the handle then being passed upwardly between the loop and the edge of the receptacle, thus engaging the hook-like supporting portion 19 with the loop 13.

The cover 12 of the receptacle may be provided with notches 23 of the shape best shown in Figure 3. The connecting members 13 extend up through these notches when the cover is positioned upon the receptacle, and thus the cover is prevented from having longitudinal movement relative to the receptacle. To remove the cover from the receptacle or place it thereon, it is therefore necessary to move it vertically. In order to guard against accidental displacement of the cover, it is very desirable to provide locking or retaining mechanism which will permit the cover to be removed at will, but which will effectively prevent its accidental displacement. The inwardly extending offset portion 20 of the handle, above described, is intended to function as a cover retaining means for this purpose. It will be noted clearly from Figure 6 that this portion 20 forms an approximately horizontal ledge overlying the cover, and prevents upward movement of the cover to an extent sufficient to free it from the basket. Even though one edge of the cover might be lifted up along the side of the hook-like portion 19, it would be stopped effectively by contact with the offset retaining portion 20, and in order to remove the cover, it would be necessary to grasp the side 18 of the handle and spring it outwardly far enough so that the cover could slip by the offset retaining portion. It will now be seen that this retaining portion 20 performs a double function, not only keeping the cover in place but also preventing the handle from becoming disengaged accidentally, as has been described above.

The operation of placing a cover on the receptacle is as follows:—The cover is properly positioned lengthwise of the receptacle, and one edge thereof is shoved to its final position under one end of the handle, as shown in Figure 7, the other edge meanwhile being some distance above its side of the receptacle. This elevated edge is then moved downwardly and in so doing it strikes the cam portion 21 of the handle as shown at the right hand side of Figure 7. The purpose of this cam portion is to act as a guiding means for the cover and to assist in springing the end of the handle to one side so as to permit the passage of the cover past the retaining portion 20. The coaction of the parts is clearly illustrated at the right hand side of Figure 7, which shows the cover in contact with the cam guiding portion 21, and in the act of forcing it to one side out of the way. As soon as the cover has reached its normal position, flat against the top edge of the receptacle, it is then below the retaining portion 20, and the handle is allowed to spring back from the position shown at the right hand side of Figure 7 to the normal position shown in Figure 6. In this position, the cover is effectively held in place by the retaining portion 20, as above described.

When it is desired to ship or store the filled receptacles with the covers thereon, great economy of space will result if it is possible to stack or pile the receptacles one on top of another. This could not be done with the handles heretofore in use unless the handles were forcibly bent over to a horizontal position, and this bending required considerable time and effort. Furthermore, when the receptacles had arrived at their destination and been delivered to the retailer, it was then necessary for him to forcibly bend the handles again to their upright position. The handle constructed according to the present invention, however, is pivoted as above described, and therefore is able to be laid down flat upon the top of the receptacle without any forcible bending or other effort being required. This position, when laid on the top of the receptacle, is indicated by the numeral 24 in Figure 1, and it is evident that when in this position, the handle does not interfere with stacking the receptacles one on top of another.

It will now be seen that a novel handle has been disclosed which will perform effectively many functions not inherent in handles heretofore known. It may be removed from its receptacle to permit telescopic stacking of the receptacles, and when applied to a receptacle, it is pivoted so that it will not interfere with stacking the receptacles on top of each other. Also, it will retain a cover in position upon the receptacle, preventing accidental displacement of the cover. This same cover retaining means also acts to prevent accidental disengagement of the handle from the receptacle. Furthermore, the handle is provided with guiding means which assists greatly in positioning a cover upon the receptacle, moving the cover retaining means to a position where it will not interfere with the placing of the cover.

While one embodiment of the invention has been disclosed, it is to be understood that the inventive idea may be carried out in a number of ways. This application is therefore not to be limited to the precise details shown, but is intended to cover all modifications thereof falling within the spirit of the invention or the scope of the appended claims.

I claim:

1. The combination with a receptacle having a removable cover, of a handle for said receptacle pivoted in a plane above the cover so as to permit the handle to swing down upon the cover, said handle comprising a supporting portion, a cover retaining portion, and terminating in free ends comprising cover guiding portions.

2. The combination with a receptacle having a removable cover, of a handle for said receptacle pivoted in a plane above the cover so as to permit the handle to swing down upon the cover, said handle comprising a supporting portion, a substantially horizontal cover-retaining portion, and terminating in free ends comprising cover-guiding cam portions.

3. The combination with a receptacle having a removable cover, of a handle for said receptacle pivoted in a plane above the cover so as to permit the handle to swing down upon the cover, said handle being formed of a piece of wire bent into a generally U-shape, and including a receptacle-supporting portion, an offset inwardly-extending cover-retaining portion, and terminating in free ends comprising upwardly and outwardly extending cam portions for guiding the cover when positioning it.

4. The combination with a receptacle having a removable cover, of a pivoted handle for the receptacle, said handle comprising a supporting portion, a cover retaining portion resiliently held in effective position, and the handle terminating in a free end comprising an oblique cam portion for guiding the cover when positioning it, said cam portion being so arranged that the pressure of the cover against it assists in moving the cover retaining portion to ineffective position so as to allow the cover to be applied to the receptacle.

5. The combination with a receptacle having a removable cover, of a handle for said receptacle pivoted in a plane above the cover so as to permit the handle to swing down upon the cover, loop-shaped members carried by the receptacle and extending above the top of the cover, the handle comprising hook-shaped supporting portions engaging said loop-shaped members and located above the top of the cover, the hook-shaped portions terminating in horizontal inwardly extending cover retaining members and said cover retaining portion terminating in upwardly and outwardly inclined free ends constituting cover guiding portions.

In witness whereof, I have hereunto signed my name.

CHARLES H. ALLEN.